United States Patent [19]
Parsons
[11] 3,831,549
[45] Aug. 27, 1974

[54] CHANNEL INDICATOR MEANS HAVING REPLACEABLE INDICIA

[75] Inventor: John M. Parsons, Portsmouth, Va.
[73] Assignee: General Electric Company, Portsmouth, Va.

[22] Filed: July 19, 1971
[21] Appl. No.: 163,786

[52] U.S. Cl. .................. 116/124.1, 40/2 R, 74/553, 116/133, 325/464, 325/464, 334/86
[51] Int. Cl. .................................................. H03j 1/02
[58] Field of Search........... 116/124.1, 124.2, 124.3, 116/124.4, 124, 133, 130, 131, ; 40/2 R, 10 R, 10 D, 20 R, 20 A, 28 C, 63 R, 68 R, 68.4, 68.6, 331; 74/553, 10.22, 10.45; 325/455, 464, 465; 334/50, 86, 87

[56] References Cited

UNITED STATES PATENTS

| | | | |
|---|---|---|---|
| 1,567,963 | 12/1925 | Lupo, Jr. | 116/124.2 R |
| 1,599,034 | 9/1926 | Weston | 116/124.2 R |
| 1,953,265 | 4/1934 | Routin | 116/124.2 R |
| 2,108,561 | 2/1938 | Kierulff | 116/124.1 R |
| 2,185,407 | 1/1940 | Kenney et al. | 74/10.22 |
| 2,257,022 | 9/1941 | Pressley | 116/129 R |
| 2,926,626 | 3/1960 | Panerai et al. | 116/133 |
| 3,029,772 | 4/1962 | Tompson | 116/124.4 |
| 3,404,657 | 10/1968 | Zmuda | 116/124.4 |

*Primary Examiner*—Louis J. Capozi
*Attorney, Agent, or Firm*—W. J. Shanley; Stanley C. Corwin; F. W. Gowers

[57] ABSTRACT

A partitioned indicia carrier having a flange or ridge about the periphery thereof is mated with a transparent cover whose rear surface approaches the peripheral flange. A knob having a shank extending therefrom engages the cover and indicia carrier such that they rotate with the knob. Thin, resilient indicia are deformably inserted between the retaining and the cover disc. New indicia may be inserted in front of existing ones, or existing indicia may be removed by flexing the cover away from the carrier to enlarge the gap between the rear of the cover disc and the peripheral ridge of the retainer disc.

3 Claims, 2 Drawing Figures

PATENTED AUG 27 1974 3,831,549

JOHN M. PARSONS INVENTOR
BY James E. Espe
HIS ATTORNEY

CHANNEL INDICATOR MEANS HAVING REPLACEABLE INDICIA

BACKGROUND OF THE INVENTION

The present invention relates to means for displaying selected indicia and, more particularly, to a channel indicator means for a television receiver having easily replaceable indicia.

When a radio or television receiver is provided with detented tuning means for selecting pretuned stations or channels, it is customary to provide indicating means showing the identity of each station or channel. In the case of VHF television channels denominated 2 through 13, channel numbers are normally permanently indicated upon the tuning means. This approach is practical for television receivers to be sold anywhere in the United States due to the allocation of only 12 channels to the VHF band.

In the case of UHF television channels, however, there is allocated a larger frequency band which is divided into 70 sub-bands or channels. These UHF channels are denominated 14 through 83. Detented tuning means for UHF stations has ordinarily not been utilized, due to the multiciplicity of possible channels in any given area. Although in any area there are ordinarily only a few UHF channels available, these channels may be any of the 70 allocated to UHF.

Recently, television manufacturers have provided UHF tuning means having a predetermined number of pretunable, detented positions. Commonly, six positions are provided, it being anticipated that it is unlikely that more than six UHF channels will be available in a given locality. It is, however, obviously impractical to manufacture a six-position channel indicator having predetermined channel numbers since any given receiver may be operated in an area where one or more of any of the 70 available UHF channels are available. It will therefore be seen that it would be highly desirable to provide a channel indicator for a detented UHF tuning control which allows various channel numbering indicia to be inserted or removed by unskilled personnel.

It is therefore an object of the present invention to provide channel indicator means which readily receive various indicia.

It is a further object to provide a channel indicator in which various indicia may be inserted or removed without the use of special tools.

It is another object of this invention to provide an improved channel indicator which receives separate, alphanuneric indicia.

SUMMARY OF THE INVENTION

Briefly stated, in accordance with one aspect of the invention, the foregoing objects are achieved by providing an indicia carrying element having a plurality of areas in one face or surface thereof which are bounded by a flange or ridge arising from the face and extending about the periphery of the retaining element. The areas are further defined by means of other, radially-extending ridges. A cover element mates with the indicia carrier such that its rearward surface is in substantially the same plane as the edge of the ridge about the periphery of the carrier. Indicia made of a thin, flexible material and having characters formed thereon are provided. The indicia are deformed slightly and inserted into ones of the partitioned areas between the carrier and cover. When fully inserted, the upper edges of the indicia pass the peripheral flange, allowing the indicia to return to their normal, flat configuration so that they are retained by the peripheral flange.

In a preferred embodiment the cover is made of a resilient material so that it may be deflected outwardly from the carrier. Indicia may then be removed through the gap between the carrier and cover elements.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawing in which:

DESCRIPTION OF THE PREFERRED EMBODIMENT

Figure 1:
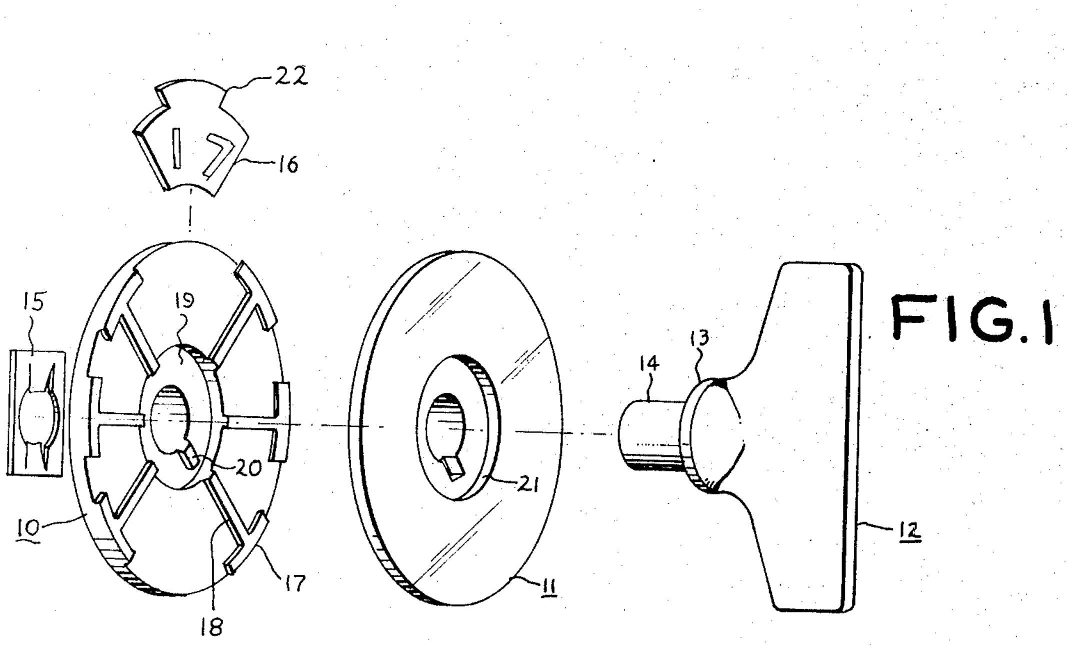
FIG. 1 is an exploded view showing components which constitute a preferred embodiment.

Referring now to FIG. 1, an indicia carrier 10 is adapted to mate against the rear surface of a cover 11, which is advantageously made of a transparent material. A knob 12 is provided for engaging the carrier 10 and cover 11, and includes a shoulder 13 and a shank portion 14 upon which carrier 10 and cover 11 may be slidingly received. Clip 15 may be forced over shank 14, the inner diameter of the clip tightly engaging shank 14 for retaining the carrier 10 and cover 11 against shoulder 13. Indicium 16, in the form of a thin, flexible numbered insert, is introduced between the assembled carrier and cover as will be hereinafter described.

Returning now to the carrier 10, a ridge or flange 17 is formed about the periphery thereof for retaining indicia. It will be seen that it is unnecessary for flange 17 to be continuous about the periphery of the carrier, and may have gaps therein to facilitate the insertion of indicia. A plurality of partitioning ridges 18 are formed in the face or surface of the carrier and extend radially outward toward the flange, forming partitioned segments or depressions in which indicia may be received. The carrier may have advantageously formed therein an annular depressed hub, generally indicated at 19, which receives a corresponding portion of cover 11. A projection or key 20 may be formed within the depressed center to prevent relative rotation of carrier 10, cover 11 and knob 12.

Cover 11, which may advantageously be a disc of transparent plastic, is provided with a depressed center section 21, the rearward face of which is adapted to mate against the bottom of hub 19. A slot may be formed therein for engaging key 20.

Figure 2:
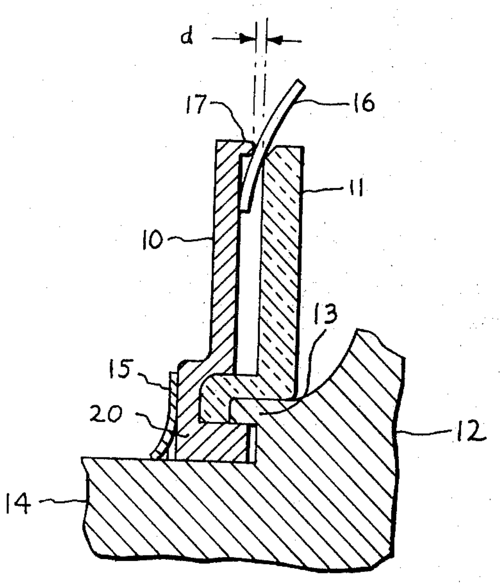
FIG. 2 is a section taken transversely through the embodiment when assembled.

Turning now to FIG. 2, there is shown an enlarged cross-sectional view of the assembled elements. It will be seen that the depressed center of cover 11 receives the mating shoulder 13 provided on knob 12, locating the cover axially on the knob. The indicia carrier 10 is then slipped over the shank 14 of knob 12 and key 20 aligned with matching openings in the cover disc 11 and shoulder 13 to prevent the relative rotation of the parts. Finally, clip 15 is forced over the shank 14 until it abuts the rearward face of hub 19 of carrier 10. The inner edges of clip 15 tightly engage the surface of shank 14, holding the carrier and cover tightly against the shoulder 13 of knob 12.

In FIG. 2, there is shown an indicium 16 partially inserted into the interstice between the front surface of carrier 10, and the rear surface of cover 11. It will be seen that the indicium must resiliently deform in order to fit through the gap between the rearward surface of cover, and the edge of flange 17. A chamfer formed at the outer rear edge of cover disc 11 facilitates the insertion and withdrawal of indicium 16.

In order to retain indicium 16 between the carrier and cover, the distance *d* between the frontal surface of flange 17 and the rear surface of cover 11 should be less than the thickness of the indicium. In a preferred embodiment, distance *d* is substantially zero, the edge of flange 17 being flush with the rear surface of cover 11. In this case, it will be appreciated that the edge of the chamfer formed on the rim of disc 11 must extend within the inner periphery of flange 17. In practice, a 45° chamfer whose lower edge extends approximately 15 mils beyond the inner periphery of flange 17 is deemed adequate for indicia approximately 10 mils in thickness.

In order to remove indicium 16, it is only necessary to deflect cover 11 forwardly to provide a gap having a width *d* which is greater than the thickness of indicium 16. By deflecting the edge of the cover at its lowest point, the indicia may simply be allowed to fall from between the elements.

In order to facilitate the removal of indicia, gaps in flange 17 are provided as shown in FIG. 1. An extended portion 22 of the upper edge of indicium 16 may then protrude through the aligned gap in flange 17 to allow the outer edge of the indicium to be moved forward into the opening between flange 17 and cover 11 when the cover is deflected. By making the gaps substantially the same size as the width of the bottom of the partitioned segments, they serve a further function by facilitating the insertion of indicia 16, initially receiving the bottom edges of the indicia to assure proper alignment with the proper depression or segment in the face of carrier 10.

It will now be appreciated by those skilled in the art that there is described herein an improved channel indicator which readily receives various indicia, and which allows the insertion and replacement of the indicia by unskilled persons. It will further be evident that various departures may be made from the invention as disclosed herein, without departing from the inventive concept. It will be seen, for instance, that partitioning ridges 18 may be formed upon the rearward surface of cover 11; or that means other than the mating depressed centers and aligned key may be utilized to provide spacing and engagement of the members. It is therefore contemplated that other modificating or applications will occur to those skilled in the art, and it is intended that the appended claims shall encompass all such modifications and applications as do not depart from the true spirit and scope of the invention.

What is claimed as new and desired to be secured by Letters Patent of the United States is:

1. A channel indicator for a television receiver, comprising:

knob means having a shank portion for engaging a tuner control and having a shoulder portion at one end of said shank portion;

a substantially circular indicia carrier having an aperture at the center thereof for receiving said shank portion, said indicia carrier further having depressions formed in the front surface thereof for receiving indicia and having flange means upstanding from said front surface and disposed about the periphery thereof;

substantially circular transparent cover means having an aperture at the center thereof for receiving said shank portion, and having means adapted to seat against said indicia carrier for spacing said transparent cover a predetermined distance from the surface of said depressions, the outside diameter of the surface of said transparent cover means facing said indicia carrier being less than the inside diameter of said flange means;

retainer means for urging said indicia carrier and said transparent cover means against said shoulder portion; and indicia means adapted to seat in said depressions, said indicia means being formed of a thin, resilient material and having characters formed on one surface thereof for display through said transparent cover means.

2. The invention as defined in claim 1, wherein said indicia carrier and said transparent cover means have annular depressions formed near the center thereof, and said indicia carrier further includes an upstanding key formed in the base of the annular depression in said indicia carrier and extending substantially radially therein, and said transparent cover means and said shoulder portion of said handle means have apertures for receiving said key to prevent angular movement between said knob means, said indicia carrier, and said cover means.

3. Channel indicator means comprising:

indicia carrier means having one surface divided into segments defined by ridges upstanding from said surface and by an upstanding flange disposed about the periphery of said surface;

indicia formed of a relatively thin, flexible material and adapted to fit within said segments;

flexible transparent cover means disposed adjacent said surface; and, means securing said cover means to said carrier means in spaced relationship to said surface whereby said indicia may be deformably inserted into and removed from said segments by flexing said cover means and whereby said indicia will normally be retained within said segments by said ridges, said flange and said cover means.

* * * * *